May 5, 1964

L. C. BATTELL ETAL 3,131,432

PLASTIC INJECTION MOLDING MACHINES

Filed Feb. 16, 1961

Inventors
Leslie C. Battell
Raymond L. Peterson
Donald B. McIlvin
By their Attorney

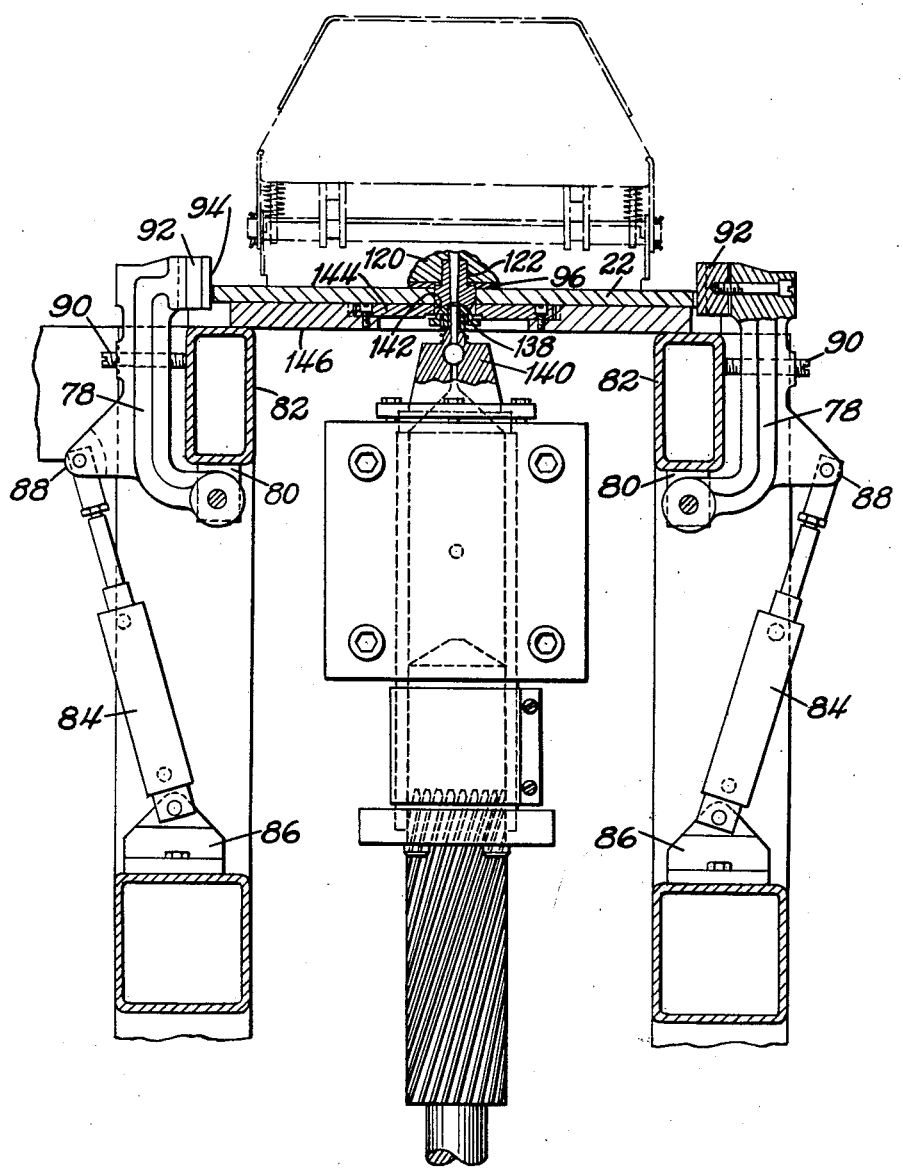

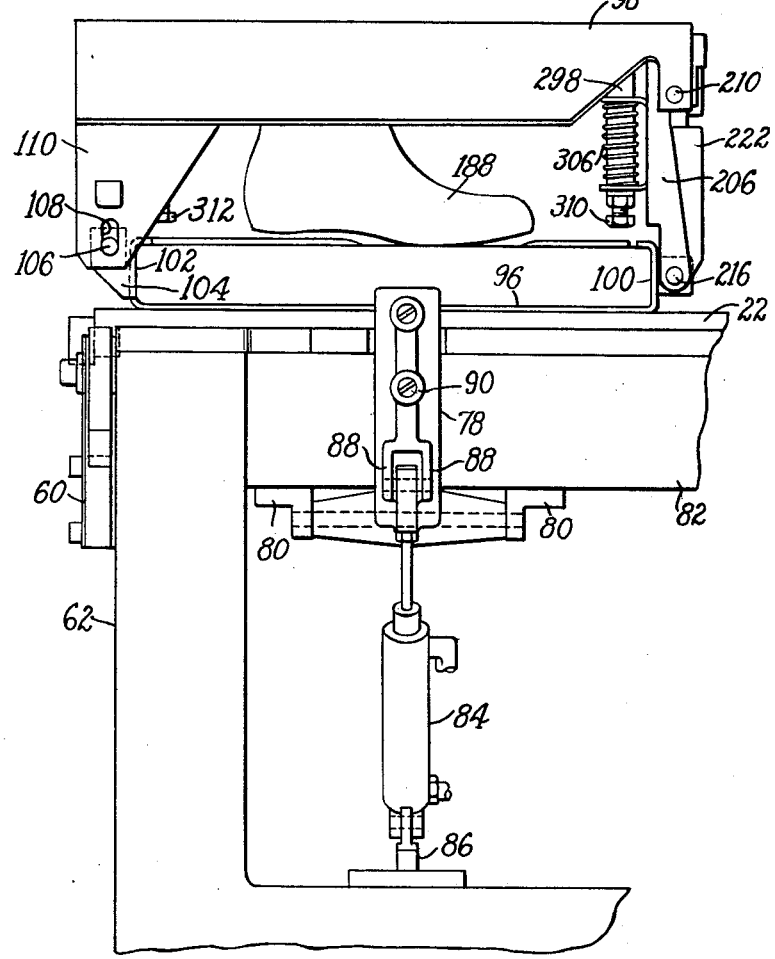

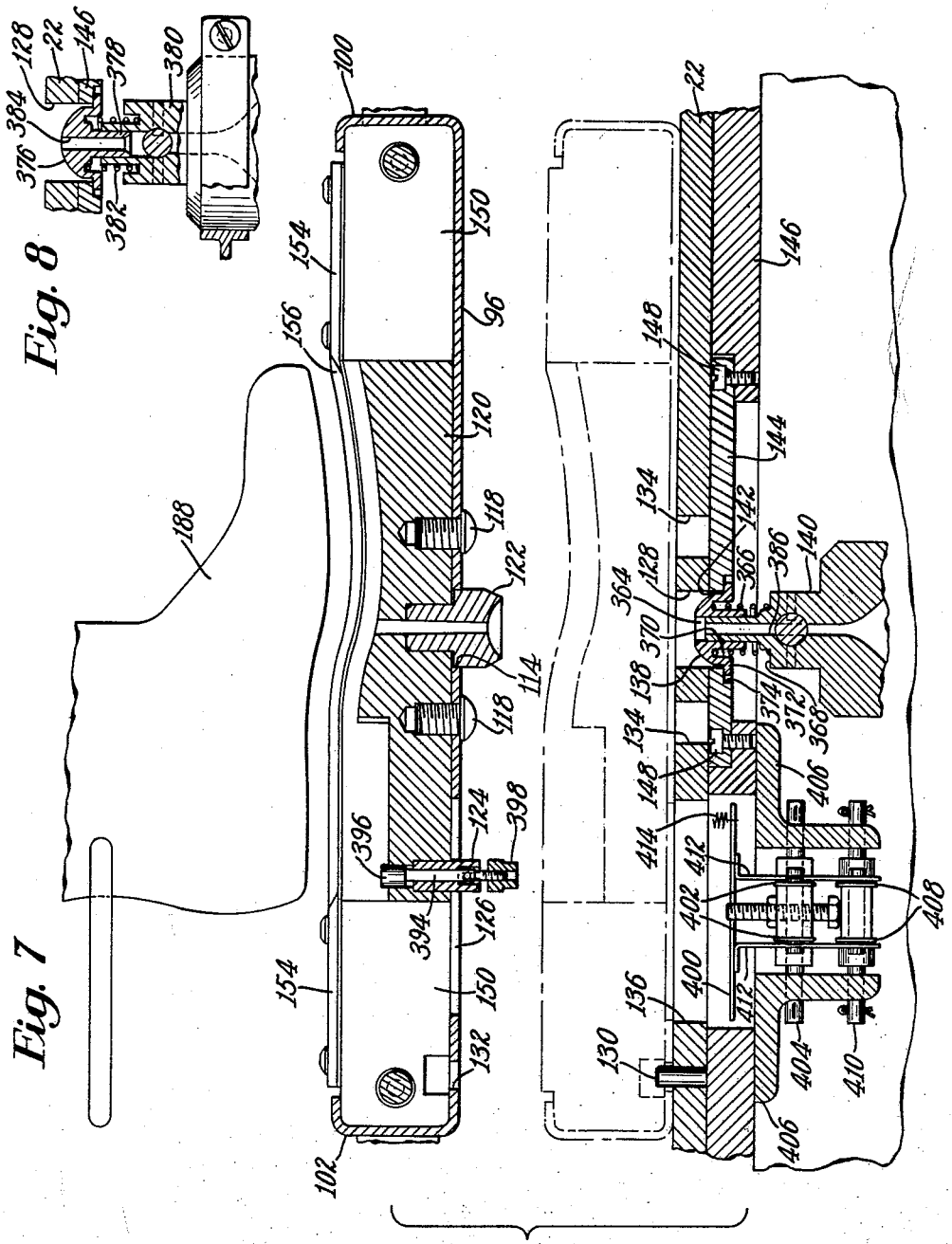

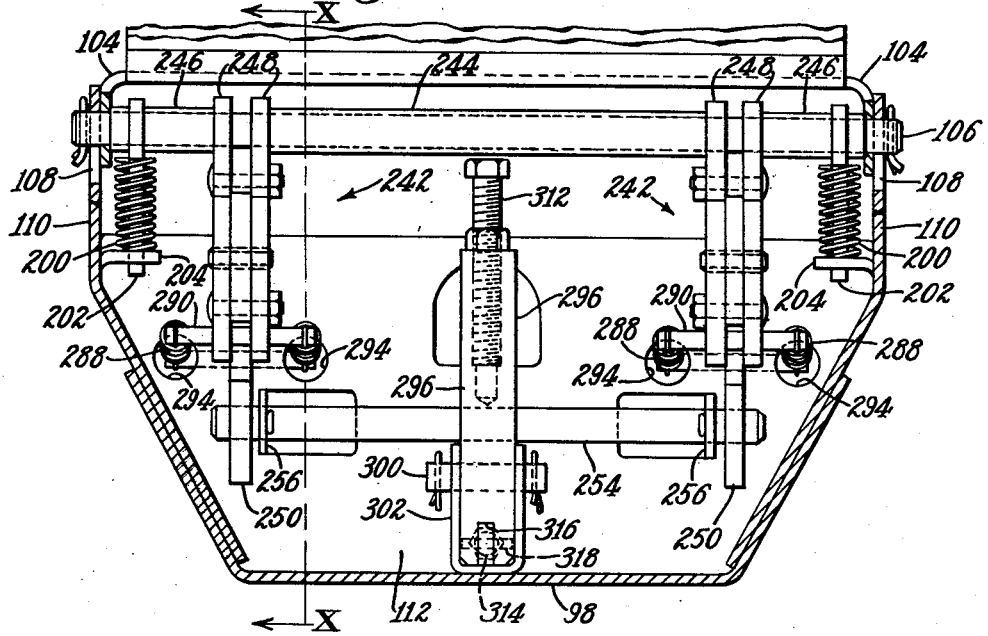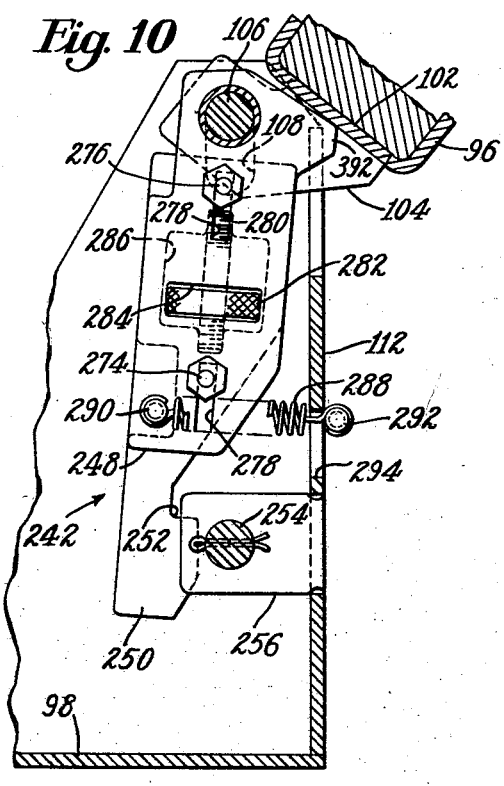

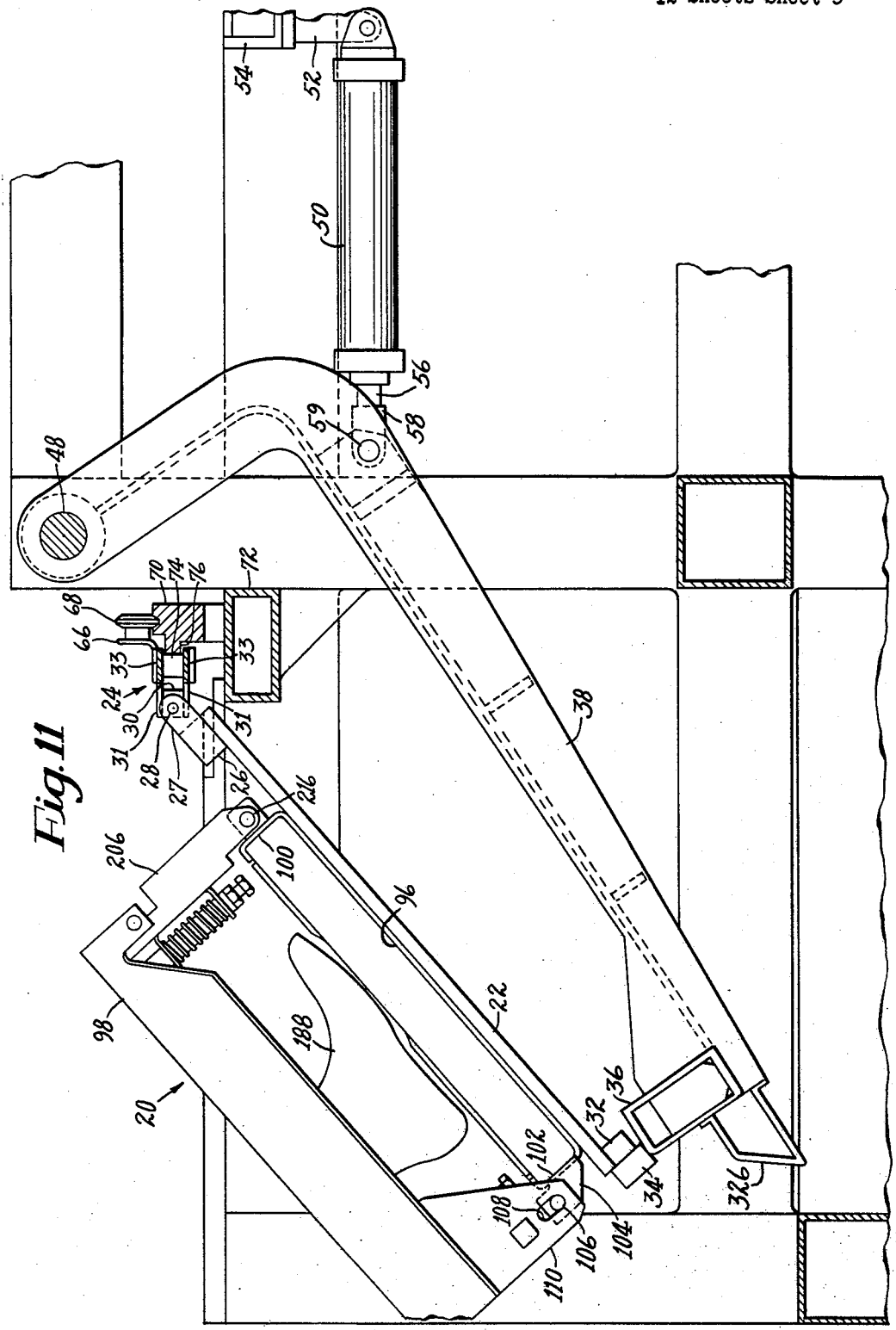

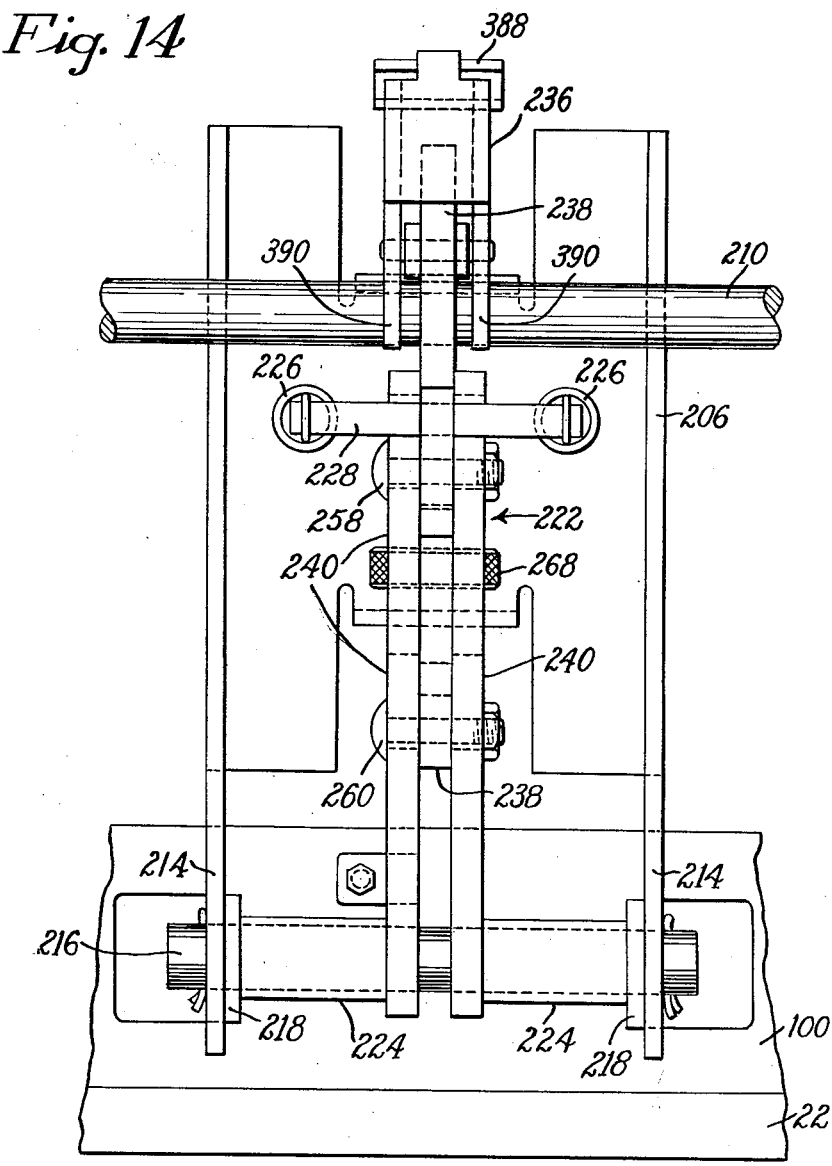

United States Patent Office 3,131,432
Patented May 5, 1964

3,131,432
PLASTIC INJECTION MOLDING MACHINES
Leslie C. Battell, Beverly, Donald B. McIlvin, Danvers, and Raymond L. Peterson, Beverly Farms, Mass., assignors to United Shoe Machinery Corporation, Flemington, N.J., a corporation of New Jersey
Filed Feb. 16, 1961, Ser. No. 89,828
3 Claims. (Cl. 18—30)

This invention relates to plastic injection molding machines and is herein illustrated in its application to machines for molding outsoles onto the bottoms of lasted shoes. A machine of this type is disclosed, for example, in an application for United States Letters Patent Serial No. 753,228, filed August 5, 1958, now Patent No. 3,006,032 in the names of Willard L. Baker et al.

The Baker et al. application discloses a multi-station machine in which a plurality of ambulatory sole-molding assemblies are indexed, seriatim, from a loading station to a mold charging station and thence through a plurality of idle stations back to the loading station where the newly molded sole is sufficiently cured and set to permit the unloading of the shoe from the shoe form and the mounting thereon of another lasted shoe onto which a sole is to be molded. Each ambulatory assembly includes, in addition to the shoe form, a bottom mold member and two side mold members which cooperate with the shoe form to define the cavity in which the sole is molded.

It will be understood that in machines of this type the relation of the shoe form to the mold elements is critical as is also the relation between the mold elements and the injection nozzle in the mold charging station. When a change from one size or style of shoes to another size or style requires the replacement of the shoe forms and the mold members in the machine a down time of several hours duration is required for the removal of the shoe forms and the mold members in the machine and their replacement by other shoe forms and mold members of the required size or style. A very substantial saving in manufacturing cost could be realized by a reduction in the duration of the down time required for the interchange. It is an important object of the present invention to provide an organization wherein a very substantial reduction in the down time required for the interchange can be realized.

It is a further object of the invention to provide an organization for automatically effecting a cycle of operations in a conveyorized injection molding machine for molding soles in situ onto shoe bottoms wherein a shoe form and mold elements are contained in a package removably mounted on the conveyor.

With the above and other objects in view as will hereinafter appear the present invention in one aspect thereof consists in the provision in an injection molding machine of a conveyor for transferring a carriage from a loading station to a mold charging station, the carriage being constructed to receive a package which mounts a shoe support or form and mold elements. The package comprises a base constructed to receive a plurality of mold elements and a cover for mounting a shoe form. The cover is mounted on the base for hinging movement relatively to the base and for a movement of translation relatively to the base whereby a lasted shoe on the shoe form is brought into mold closing relation to the mold elements. A plurality of springs incorporated in the package supports the cover in an intermediate position in which the shoe form is spaced from the mold elements. The carriage is indexed from the loading station to the mold charging station with the cover in its intermediate position. In the mold charging station the cover is located in proximate relation to a presure platen which is operated by a suitable lever to move the cover from its intermediate position into mold closing relation to the molding elements. The pressure platen is suspended from the lever so as to permit relative horizontal movement of the platen and the lever incidental to the operation of the lever. After the platen has brought the shoe form into its mold closing position it remains in its pressure applying position to maintain the position of the shoe form against the mold charging pressure.

In accordance with a further feature of the invention, the carriage, during its movement through the idle stations of the machine, is supported upon a fixed rail and during its movement through the loading station and the mold charging station is supported upon two movable rail sections. The rail section in the loading station is secured to a support which is transferred between an indexing position and a position in which the carriage is located for the unloading of a shoe with a newly molded sole thereon from the shoe form and the loading on the shoe form of a lasted shoe onto which a sole is to be molded. The rail section in the mold charging station is mounted for swinging movement to transfer the carriage in the mold charging station between a mold charging position and an indexing position. The transfer of the swinging rail in the mold charging station into its indexing position is effected by movement of the rail section in the loading station into its indexing position, the latter rail section being arranged to engage the swinging rail section and move it into a position of horizontal alinement with the fixed rail preparatory to the indexing operation.

These and other features of the invention will now be described with reference to the accompanying drawings and pointed out in the appended claims.

In the drawings:

FIG. 5 is a front elevation illustrating the carriage and certain operating instrumentalities in the charging station, the package generally being shown in broken lines, and certain parts being shown in section on a plane common to the axis of the injection nozzle;

FIG. 6 is a right side elevation of an ambulatory assembly in the charging station illustrating particularly the means for effecting registration of the mold assembly with the injection nozzle;

FIG. 7 is an exploded view in right side elevation illustrating the carriage and parts of the mold package largely in section on a plane common to the axis of the injection nozzle, the normal position of the package on the carriage being shown in broken lines;

FIG. 8 is a detail view in side elevation illustrating an alternative nozzle construction largely in section on a plane common to the axis of the nozzle;

FIG. 9 is a front elevation illustrating portions of the package in the loading station, partly in section on the line IX—IX of FIG. 4, the cover of the package being swung forwardly and into an inverted position to present a shoe form in position for the unloading and reloading operations;

FIG. 10 is an enlarged sectional view taken on the line X—X of FIG. 9;

FIG. 11 is a right side elevation taken at the loading station;

FIG. 14 is a right end view of the mechanism illustrated in FIG. 12.

Figure 1:
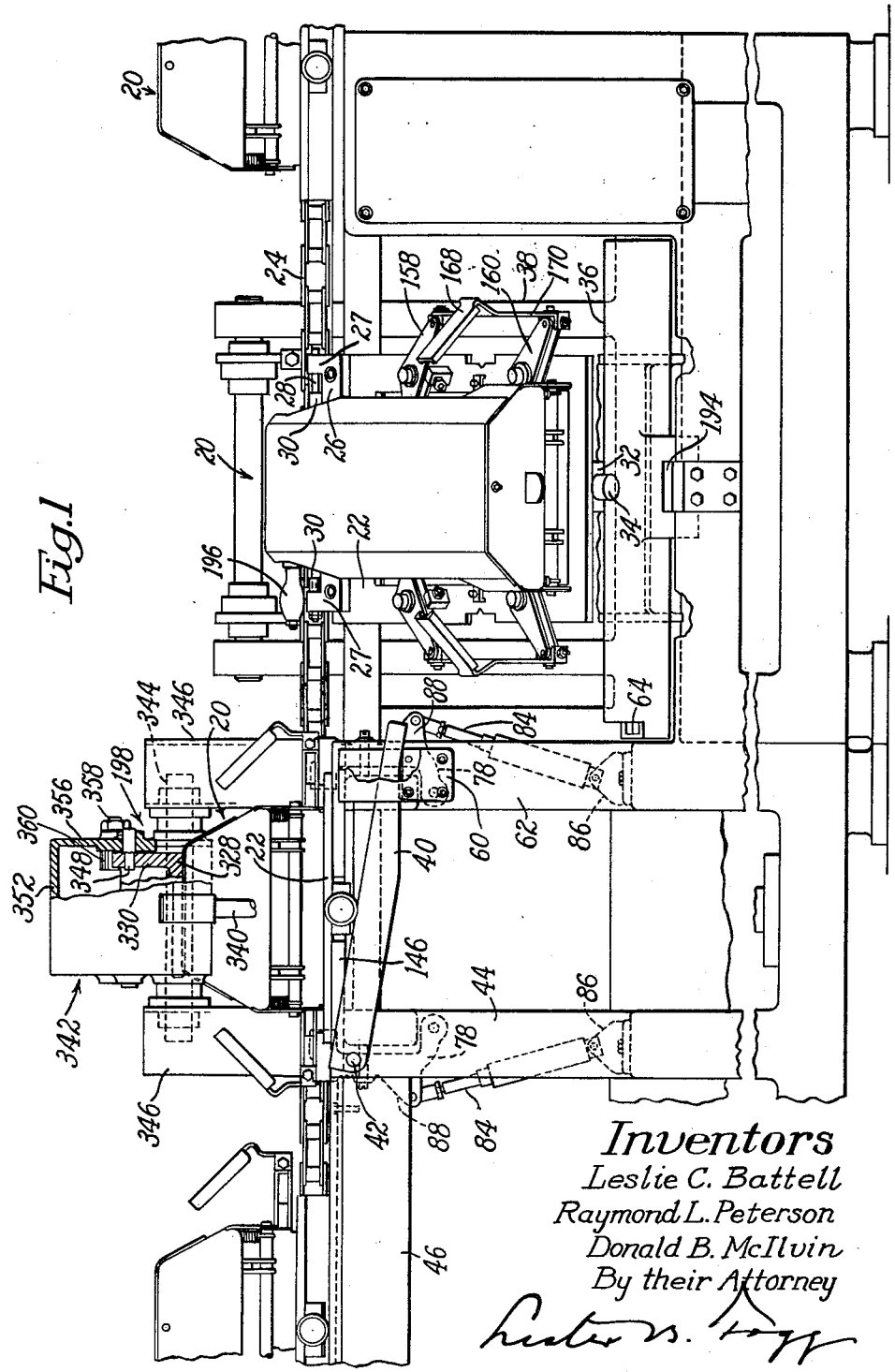
FIG. 1 is a front elevation illustrating the loading station and the mold charging station of a machine embodying the features of the present invention.

The invention is illustrated in the drawings as embodied in a machine of the type disclosed in the Baker et al. application for United States Letters Patent hereinbefore referred to.

Machines of this type are provided with an endless conveyor mechanism on which a plurality of ambulatory mold assemblies are mounted at positions uniformly spaced along the length of the conveyor. The operation starts at a loading station where a shoe, onto which an outsole has been molded, is removed from a shoe form in the mold assembly and a lasted shoe, onto which an outsole is to be molded, is mounted on the form preparatory to the molding operation. The conveyor mechanism transfers the ambulatory mold assembly together with the lasted shoe from the loading station to a charging station in which an outsole is molded onto the shoe bottom. From the charging station the conveyor mechanism transfers the mold assembly through a plurality of idle stations and finally brings it back to the loading station from which the cycle was initiated. Sufficient time transpires from the mold charging operation to the arrival of the mold assembly at the loading station to permit the curing or solidification of the molded sole to a degree sufficient to permit the opening of the mold at the loading station and the removal of the shoe from the work support.

The endless conveyor mechanism of the illustrated machine is equipped with twelve carriages, each of which carries an ambulatory mold assembly. To facilitate the handling of each mold assembly and the placement thereof on a carriage in the conveyor system, the mold assembly is mounted in a package in which the mold members and the shoe form are arranged in predetermined positions such that no adjustment thereof is required after the package is placed on the carriage and secured thereto.

Referring to FIG. 1, the numeral 20 identifies a mold package mounted on a carriage 22 located at the molding station. For transferring the carriage from station to station a conveyor in the form of an endless chain 24 of known construction is mounted on suitable sprockets (not shown) for operation in a horizontal plane. The carriage is herein illustrated as a plane rectangular plate which carries at its rear end a narrow plate 26 having rearwardly extending lugs 27. Referring to FIG. 11, the lugs 27 carry a shaft 28 arranged parallel to the conveyor chain and journaled in blocks 30 swiveled between forward extensions 31 of selected links 33 of the chain. At its forward portion the carriage 22 has secured to its bottom surface a block 32 which carries a roll 34 which rides on a rail which, in the illustrated machine, is made in three sections, a short section 36 secured to the forward portion of a swinging frame 38, a short section 40 (FIG. 1) pivotally mounted at 42 on a standard 44, and a long rail section 46 extending from the mold charging station through the ten idle stations of the machine and back to the loading station. Referring to FIG. 11, the frame 38 is a generally L-shaped channel structure pivotally mounted on a shaft 48 fixed in the machine frame. For transferring the carriage 22 and the mold package 20 mounted thereon from the loading position illustrated in FIG. 11 to a generally horizontal indexing position, a hydraulic cylinder 50 is pivotally mounted on a bracket 52 fixed to and depending from a horizontal section 54 of the machine frame. Mounted in the cylinder is a piston having a rod 56 extending forwardly therefrom, said rod carrying at its forward end a head 58 which is journaled on a shaft 59 in the frame member 38 near its elbow. It will be understood that the rail section 36 is wide enough to accommodate the movement of the roll 34 widthwise of the rail during the swinging movement of the frame section 38.

To provide for mating engagement of a sprue member hereinafter described with the injection nozzle, the rail section 40 in the charging station is mounted for swinging movement from a horizontal position into its inclined position illustrated in FIG. 1. This position of the rail section 40 is determined by the engagement of its tapered free end portion with the base of a suitable notch formed in a bracket 60 secured to a standard 62. The carriage in the mold charging station is elevated or swung upwardly into its indexing position by the upward swinging movement of the frame member 38. To this end the left-end portion of the rail section 36 has a notch 64 formed therein. During the upward movement of the rail section 36 the base of the notch engages the end portion of the rail 40 and swings the rail 40 upwardly into a horizontal position. It will be understood that when the rail sections 36 and 40 are in their respective elevated positions they form with the rail 46 a continuous track for the roll 34 at the forward end of the carriage.

Figure 4:
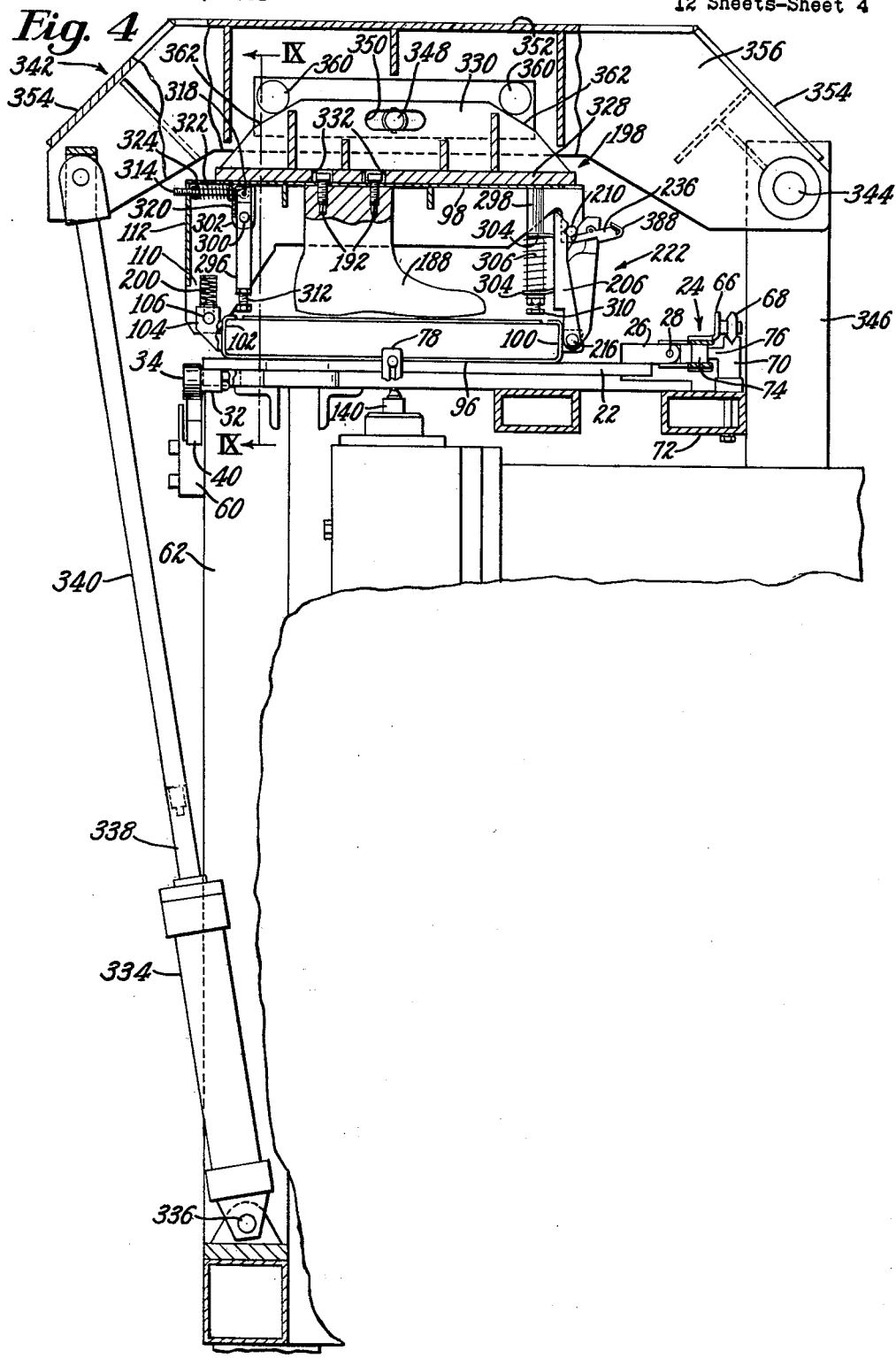
FIG. 4 is a right side elevation of the charging station, partly in section on the longitudinal axis of a shoe form in the package.

Referring to FIG. 4, for supporting rectilinear reaches of the illustrated conveyor chain, upstanding angle brackets 66 are secured to the upper portions of the link pins at selected points along the length of the chain. Each of these brackets carries a roll 68 which travels in a V groove in a rail 70 secured to a frame section 72. For taking the lateral thrust exerted against the conveyor chain, selected chain links carry rolls 74 which bear against a forwardly extending portion 76 of the rail 70.

Figure 3:
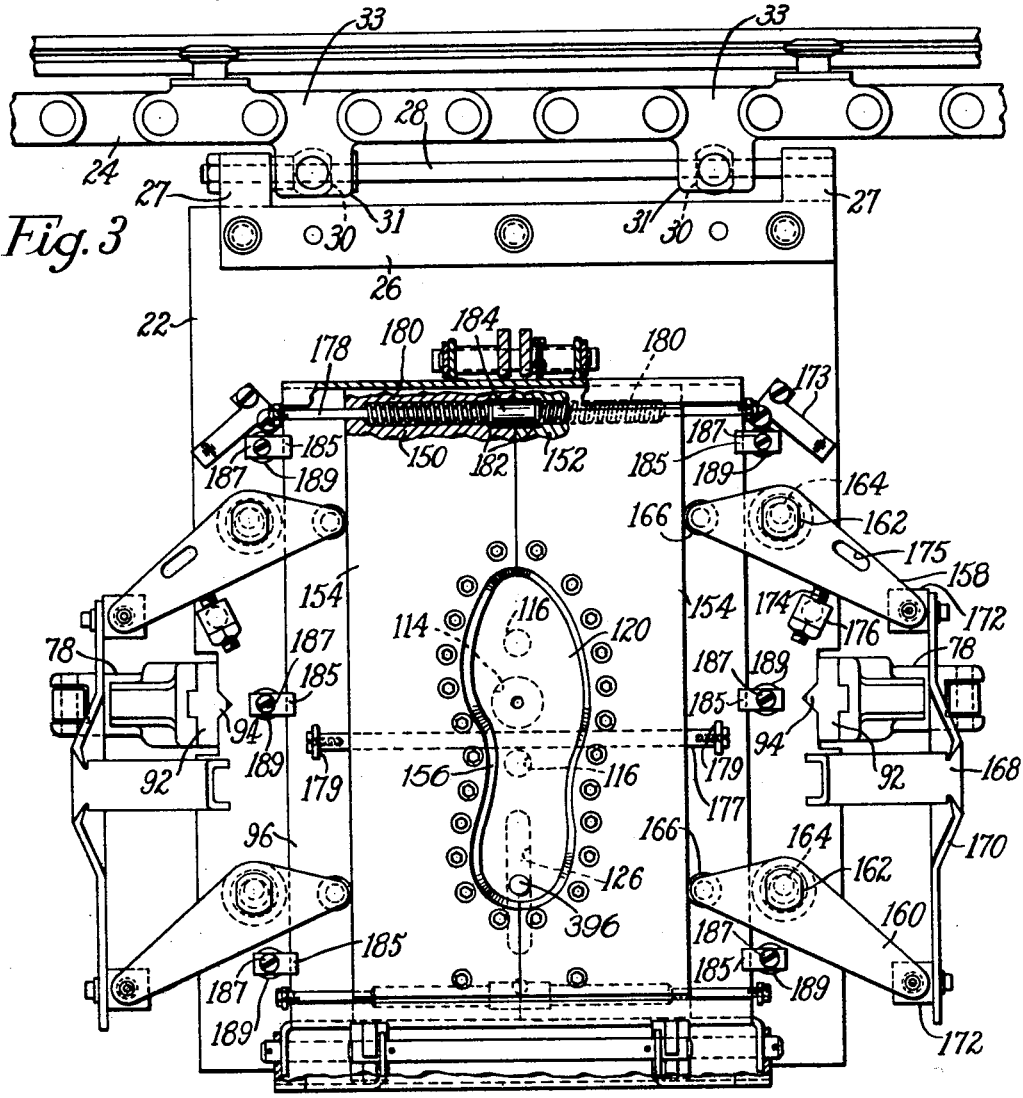
FIG. 3 is a plan view of a mold package mounted on a carriage, the cover of the package being removed and the side molds being shown in their closed position, certain parts being broken away and other parts being shown in section to illustrate underlying structure.

For accurately determining the position of the carriage 22 in the mold charging station a pair of positioning levers 78 (FIG. 5) are pivotally mounted for opposite movement on brackets 80 extending downwardly from horizontal sections 82 of the frame. A pair of cylinder and piston assemblies 84 are pivotally mounted at their lower ends on fixed brackets 86 and at their upper extremities between ears 88 projecting from the levers 78. Said assemblies are hydraulically operated to swing the positioning levers toward each other into positions determined by the engagement of abutment screws 90 carried by the positioning levers with the frame sections 82. Referring to FIG. 3, each positioning lever carries at its upper extremity a plate 92 having a V-shaped extension 94 which engages a complementally shaped notch formed in the carrier 22. It will be seen that the positioning levers operate to locate the carriage 22 widthwise, lengthwise and angularly in the mold charging station, thus insuring an accurate registration of a sprue member hereinafter described with the injection nozzle.

Figure 2:
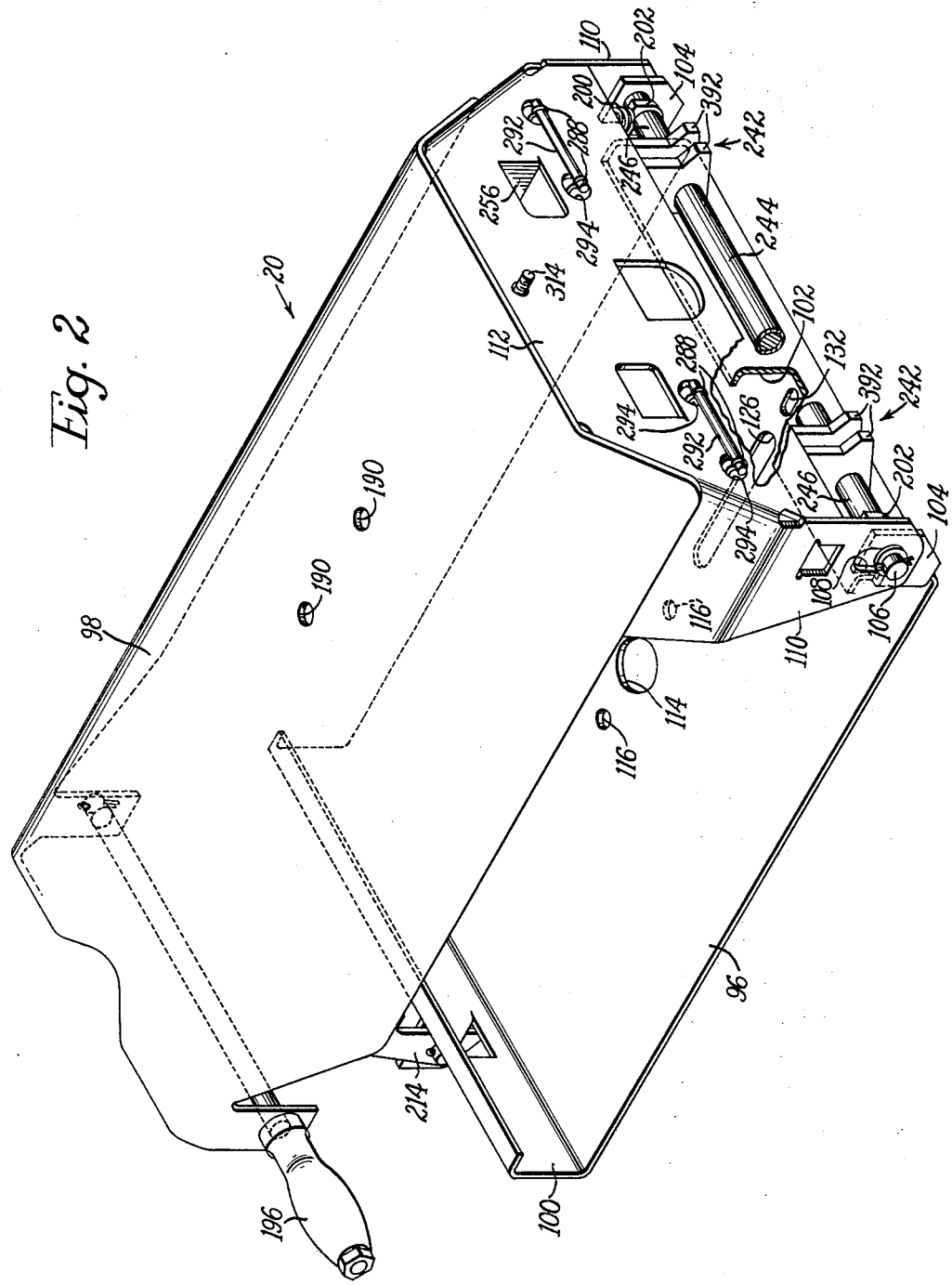
FIG. 2 is a perspective view of a mold package.

Referring to FIG. 2 illustrating a mold package of the type provided for use in the illustrated machine, the illustrated package comprises a base 96 and a cover 98 hinged on the base. The illustrated base is a flat sheet metal member having its opposite ends bent upwardly and the extremities of the end portions turned inwardly to form channels 100 and 102. The channels provide guideways within which side mold members, hereinafter described, move relatively to each other between their closed and open positions. Formed in opposite end portions of the channel structure 102 are ears 104 which are bored to receive a shaft 106. The end portions of the shaft 106 extend through vertical slots 108 formed in legs 110 formed in an end plate 112 welded to the cover 98. The slotted end portions of the legs 110 engage respectively the outer surfaces of the ears 104 and thus hold the cover against movement endwise of the shaft 106. The central portion of the base has formed therein a large bore 114 and two small bores 116. Referring to FIG. 7, two headed screws 118 extend through the small bores and attach a bottom mold member 120 in a fixed position on the base 96. The large bore 114 receives the cylindrical lower portion of a sprue member 122, the reduced upper portion of which is seated in a socket formed in the bottom mold member. The sprue member forms a close fit in the large bore 114 and serves to position the bottom mold member accurately in predetermined relation to the base 96. The orientation of the bottom mold member relatively to the base is determined by the engagement of a tubular member 124 mounted in and projecting downwardly from the heel end portion of the bottom mold member with the walls of a slot 126 formed in the base 96 and arranged in alinement with the bores 114 and 116. That portion of the sprue member 122 projecting downwardly from the base 96 is received in a bore 128 formed in the carriage 22 and thus serves to locate the package relatively to the carriage. The orientation of the package relatively to the carriage is determined by the engagement of a dowel 130 projecting upwardly from the carriage through a slot 132 formed in the base 96. Two bores 134 formed in the carriage provide clearance for the heads of the screws 118. A slot 136 formed in the carriage provides clearance for the tubular member 124, the position of which varies in accordance with the length of the bottom mold member. The lower extremity of the sprue member has a concave end face complemental in shape to the upper surface of a nipple 138 at the upper extremity of an injection nozzle 140. The nipple is positioned in a bore 142 in a circular plate 144 which covers a clearance opening in a plate 146 secured to the machine frame. The plate 146 provides a rigid support for the carriage 22 and the package mounted thereon during the mold charging operation. The plate 146 is rabbeted to receive the plate 144 which is attached thereto by headed screws 148. Referring to FIG. 3, the illustrated bottom mold member defines the peripheral contour of an outsole for a shoe in the range of children's sizes. As shown in side elevation in FIG. 7, the bottom mold member defines the profile contour of a sole and heel unit. In FIG. 3 a pair of side mold members 150 and 152 are shown in their relatively closed position. It will be seen that the meeting edge faces of the side mold members are in alinement with the axes of the bores 114 and 116 and with the center of the slot 126. Said meeting edge faces are also in alinement with the longitudinal median line of the bottom mold member 120. As shown in FIG. 7, each side mold member carries a welt plate 154, so called. When the side mold members are in their closed position illustrated in FIG. 3 the beveled inner edges 156 of the welt plates define the contour of a lasted shoe at the feather line.

For closing the side mold members 150, 152 duplicate mechanisms are provided. Referring to FIG. 3, and particularly to the manually operated organization for closing the right side mold member 152, a pair of levers 158 and 160 are mounted on headed screws 162 having eccentric stems 164 mounted in suitable bores in the carriage 22. The eccentricity of the stem 164 permits adjustment of each lever bodily toward and from the longitudinal center line of the carriage by a turning movement of the screw. The screw carries a nut (not shown) which bears against the bottom of the carriage to clamp the screw in adjusted position. The head of the screw is slabbed off at opposite sides to facilitate the adjustment thereof by a flat wrench or the like in setting up the side mold closing organization. The mold closing levers at opposite sides of the mold assembly are advanced into a closed position determined by the engagement of one lever in each assembly with an abutment screw 174 mounted in a suitable fixture 176 in the carrier 22. If any space exists between the side mold members after the levers have been advanced to the limit of their closing movement the screws 162 are adjusted as required to bring the side mold members into their fully closed position illustrated in FIG. 3, and the nuts carried by the screws are tightened to secure the levers in their respective adjusted positions. To ease its action on the side mold member each lever carries at its inner end a roll 166 which bears against the outer edge face of the mold member. For operating the levers 158 and 160, a handle 168 is incorporated in a link 170 which carries at its opposite ends yokes 172 pivotally mounted on the outer end portions of the levers 158 and 160, respectively. For holding the levers in their respective retracted positions a spring clip 173 is secured to the carriage 22 and is so arranged that an upstanding lip formed in its free end portion enters a suitable slot 175 formed in the lever 158 to retain the mold closing assembly in its retracted position. In order to maintain an accurate alinement of the side mold members 150, 152 with the bottom mold member 120 and to insure rectilinear movement of the side mold members between their respective opened and closed positions, the mold members have formed therein alined rectilinear grooves extending widthwise of the mold assembly in the region of the shank portion of the bottom mold member and a guide rail 177 is inserted into the grooves and confined between the bases of the grooves and the base 96 of the mold package. At its opposite ends the rail 177 carries upstanding stop members 179 which restrict the opening movement of the side mold members. The side mold members are opened automatically by the expansion of springs located at opposite end portions of said members. In the illustrated mold assembly duplicate spring organizations are provided and the following description of the organization at the toe end of the assembly applies also to the organization at the heel end. The toe end portions of the side mold members are drilled widthwise thereof to receive a rod 178. Surrounding the rod and positioned in counterbores in the mold members are two springs 180. These springs are confined between the bases of the counterbores and washers 182 which bear against opposite ends of a sleeve 184 mounted on the rod 178 and positioned together with the washers in suitable counterbores formed in the side mold members. The operation of the mold closing levers loads the springs 180 and upon the retraction of the levers the springs expand to open the side mold members.

In order to hold the base 96 of the mold package flat against the upper surface of the carriage 22, three clips 185 are arranged at opposite sides of the base 96 with end portions thereof bearing against the side margins of the base. Suitable screws 187 secure the clips 185 to the carriage 22, washers 189 being interposed between the clips and the carriage to bring the clips up to the level of the base 96.

To provide for the mounting of a shoe form, such, for example, as the form 188 illustrated in FIG. 4, the cover 98 of the mold package has two holes 190 (FIG. 2) drilled therein at spaced points on its longitudinal center line. Referring to FIG. 4, the holes 190 receive headed screws 192 which attach the shoe form 188 to the underside of the cover 98. The holes 190 are made sufficiently oversize to permit any required adjustment of the shoe form to bring it into registration with the mold cavity defined by the closed side mold members.

Preparatory to the removal of a shoe from the shoe form 188 in the loading station the cover 98 is swung forwardly into a position in which it is supported by a bracket 194 (FIG. 1) in a horizontal position in which the shoe form is inverted and conveniently positioned for the unloading and reloading operations. After a lasted shoe onto which a sole is to be molded has been mounted on the shoe form, the operator grasps a handle 196 carried by the cover and swings the cover upwardly and rearwardly into an intermediate position shown in FIGS. 1 and 4. In this position the shoe form registers with the mold cavity but is spaced therefrom as shown in FIG. 4. From this intermediate position the shoe form is moved downwardly into its mold closing position by the hydraulic operation of a pressure platen 198 which bears against the top of the cover 98. A suitable latch, hereinafter described, holds the cover initially in its intermediate position. Upon the completion of the mold charging operation suitable latches positively hold the cover in its depressed position while the conveyor advances the ambulatory assembly through the idle stations of the machine to the loading station where the latches are released and the cover is swung forwardly preparatory to the removal of the shoe from the form. At its hinged end the cover is yieldingly supported in its intermediate position by two springs 200 (FIG. 9). Each spring surrounds a flat arm 202 which is bored at one end to receive the shaft 106. The spring is confined between shoulders formed in the arm 202 and an ear 204 struck from the leg 110, the ear 204 being slotted to receive the arm in sliding engagement.

Figure 12:
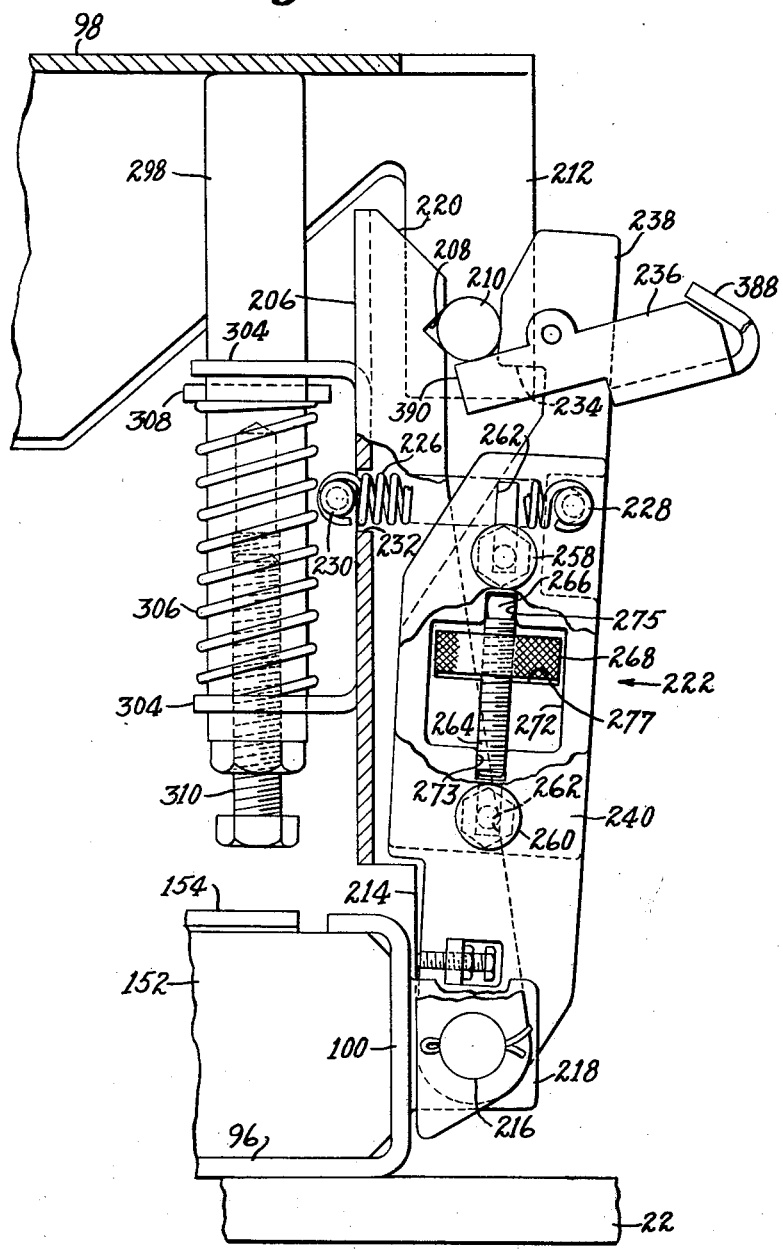
FIG. 12 is an enlarged detail view illustrating a latch mechanism in the mold package.
Figure 13:
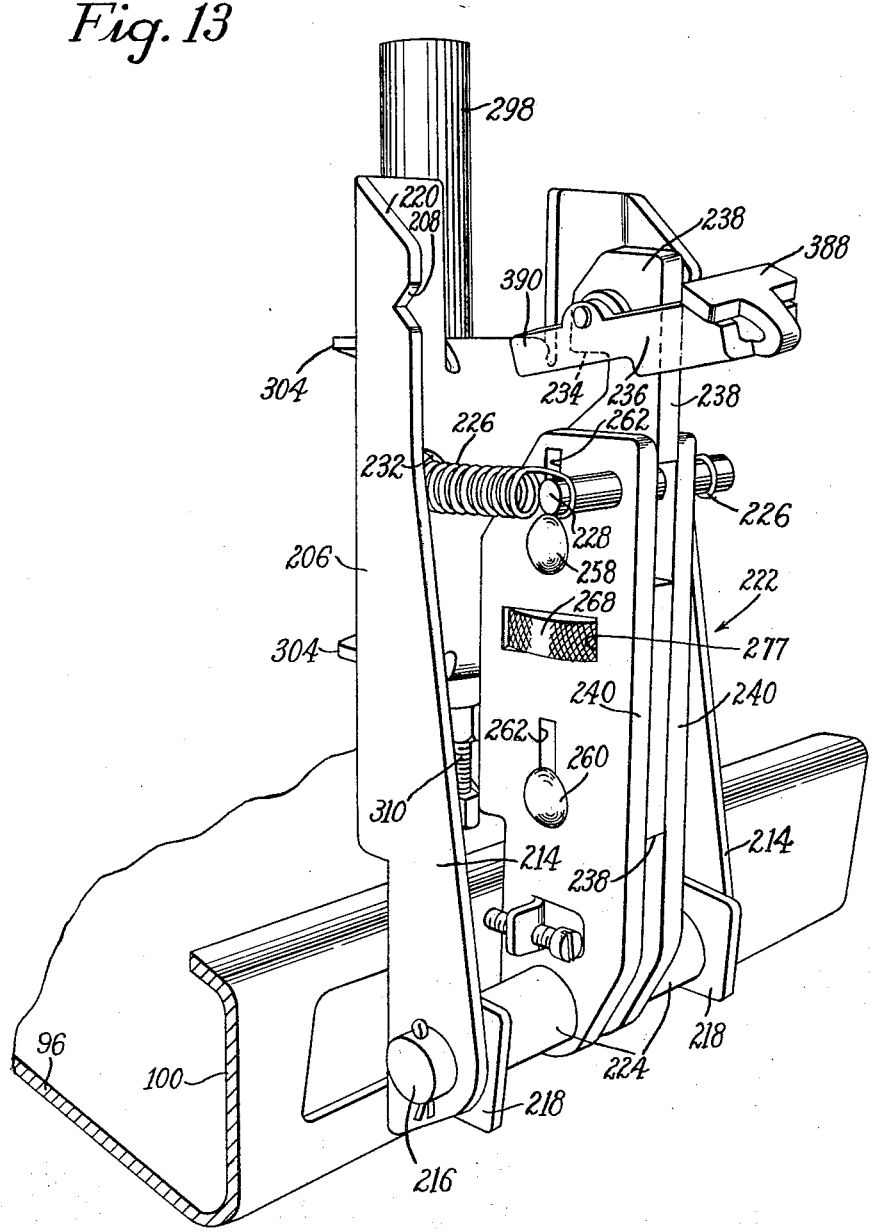
FIG. 13 is a perspective view illustrating mechanism shown in FIG. 12.

The intermediate position of the hinged end portion of the cover is determined by the engagement of the lower end portions of the grooves 108 with the opposite end portions of the shaft 106. The free end portion of the cover 98 is located in its intermediate position by the latch assembly illustrated in FIGS. 12, 13 and 14. Referring to FIG. 13, the latch assembly comprises an upstanding channel member 206 having V notches 208 formed in its side portions. As shown in FIG. 12, the notches 208 receive a cross shaft 210 mounted in downwardly extending arms 212 at the free end of the cover. For mounting the channel member 206 a pair of arms 214 extend downwardly therefrom and are bored to receive a shaft 216 mounted in ears 218 struck from the channel 100 of the base 96. As shown in FIG. 12, the arms 214 are spaced from the channel 100 sufficiently to permit only a limited swinging movement of the channel member on the shaft 216. The upper extremities of the channel member have downwardly inclined edges 220 which are engaged by the shaft 210 as the cover swings downwardly into its intermediate position. The channel members swing to the right as seen in FIG. 12 to cause the V notches 208 to engage the shaft 210. To this end a latch member herein illustrated as a composite upstanding arm 222 is mounted for swinging movement on the shaft 216 and is positioned endwise of the shaft by two spacer members or sleeves 224 (FIG. 13) mounted on the shaft and confined between the ears 218 and the lower extremities of the latch member 222. The channel member 206 and the latch member 222 are urged toward each other by two springs 226 anchored at their outer ends to a cross pin 228 carried by the latch member 222 and at their inner ends to a cross pin 230 (FIG. 12) which bears against the web portion of the channel member, said web portion having bores 232 through which the springs extend. Upon the downward movement of the cover 98 to bring the shoe form into mold closing position the latch member 222 is advanced by the springs 226 from its position in FIG. 12 into a position in which the undercut latch surfaces 234 engage the upper portion of the shaft 210 and hold the cover against upward movement. The downward movement of the cover from its intermediate position also swings a latch release member 236 pivotally mounted on the latch member 222 from its generally horizontal position illustrated in FIG. 12 into an upright position. Inasmuch as the depressed position of the cover 98 must be adjusted to accommodate different types of shoe forms, the position of the latching surface 234 must be adjustable to accommodate different positions of the cover.

Accordingly, the latch member 222 comprises an upper section 238 and a lower section 240 which are relatively movable endwise of the latch member. The lower section comprises a pair of parallel plates (FIG. 14) arranged at opposite sides of the upper section 238 and secured thereto by clamping bolts 258 and 260 extending through longitudinal slots 262 (FIG. 12) formed in the parallel plates comprising the lower section and through suitable bores in the upper section 238. To provide for endwise adjustment of the upper section 238 relatively to the lower section, a screw 264 having at its upper end a square head 266 is confined between the parallel plates of the lower section and positioned in an opening 272 formed in the lower part of the upper section. The screw is held against endwise movement by seating its lower end portion in a notch 273 extending downwardly from the recess 272 and by seating its headed upper end portion in a similar notch 275 extending upwardly from the opening 272. The screw is held against rotation by the engagement of its head 266 with the side walls of the notch 275 and with the inner surfaces of the parallel plates of the lower section 240. Mounted on the screw 264 is a cylindrical knurled thumb nut 268 which is confined between upper and lower walls of notches 277 (FIG. 13) formed in the parallel plates 240. Rotation of the nut 268 effects endwise movement of the screw 264 together with the upper section 238 to lengthen or shorten the over-all length of the latch member. When it is desired to adjust the length of the latch member 222 the bolts 258 and 260 are released and the thumb nut 268 is operated to effect adjustive movement of the arm 238 relatively to the arms 240 whereupon the bolts 258 and 260 are tightened to clamp the two sections of the latch member together.

For holding the hinged end portion of the cover 98 together with the shoe form 188 attached thereto in its mold charging position, a pair of latch members 242 (FIG. 9) are mounted for swinging movement on the shaft 106 and are positioned endwise of the shaft between spacers comprising a long central sleeve 244 mounted on the shaft and two short sleeves 246 positioned between the latch members and the arms 202. Each latch member 242 is a composite structure comprising two parallel arms 248 (FIG. 10) mounted for swinging movement on the shaft 106 and an arm 250 mounted between the parallel arms and having formed therein an undercut latching surface 252 which engages a cross shaft 254 after the pressure platen 198 has brought the cover into its mold closing position. The illustrated cross shaft 254 is mounted in suitable bores in a pair of ears 256 struck from the end plate 112. The two sections of the latch are secured together by bolts 274 and 276 extending through longitudinal slots 278 in the arms 248 and through suitable bores in the arm 250. The arm 250 carries a screw 280 on which is mounted a knurled cylindrical thumb nut 282. The nut 282 bears against the upper and lower surfaces of slots 284 formed in the arms 248 and extends outwardly through a clearance opening 286 formed in the arm 250. The latch members 242 are adjusted by the nuts 282 in the same manner as the latch 222 and are secured in adjusted position by the clamping bolts 274 and 276. Each latch 242 is urged into latching position by a pair of springs 288 anchored to a cross pin 290 mounted in the arms 248 and anchored at their opposite ends to a cross pin 292 which bears against the outer surface of the end plate 112, suitable openings 294 being punched in the end plate to receive the outer end portions of the springs.

For precisely determining the mold closing position of the shoe form 188 two abutment members 296 and 298 (FIG. 4) are provided. The abutment member 296 depends from a cross pin 300 mounted in a yoke 302 secured to the cover 98. The abutment member 298 is herein illustrated as a shaft slidably mounted in ears 304 struck from the channel member 206. The upper end of the shaft is held against the inner surface of the cover 98 by a spring 306 surrounding the shaft. Referring to FIG. 12, the spring 306 bears against the lower ear 304 and at its upper end bears against a cross pin 308 in the shaft. The abutment member 298 carries at its lower end a headed abutment screw 310 adjustable endwise off the shaft and arranged to engage the welt plate 154. Similarly, the abutment member 296 carries an adjustable abutment screw 312. In order to provide adequate room for the hands of the operator between the shoe form and the abutment member 296 during the unloading and reloading operations provision is made for swinging movement of the abutment member away from the heel end of the shoe form during the swinging movement of the cover forwardly to bring the shoe form into position for the unloading and reloading operations. To this end, a screw eye 314 is positioned in an open-ended slot 316 (FIG. 9) in the upper portion of the abutment member and pivotally mounted on a cross pin 318 carried by the abutment member. The screw eye 314 extends horizontally from the abutment member through an opening in an ear 320 (FIG. 4) formed in the yoke 302 and through an opening in the end plate 112. The abutment member is normally held in its position illustrated in FIG. 4 by the engagement of its upper end portion with the ear 320, the abutment member being biased to this position by a spring 322 surrounding the screw eye 314 and confined between the ear 320 and a nut 324 on the screw eye. When the cover 98 is swung forwardly to position the shoe form 188 for the unloading and reloading operations the outer end of the screw eye strikes a bracket 326 (FIG. 11) on the frame 38 and continued movement of the cover thereafter causes the abutment member to swing in a clockwise direction as seen in FIG. 4 to provide clearance for the hands of the operator between the abutment member and the heel end of the shoe form. Upon the return of the cover to its closed position the spring 322 returns the abutment member to its position illustrated in FIG. 4.

Referring to FIGS. 1 and 4, the illustrated pressure platen 198 for moving the cover 98 downwardly into its mold charging position is herein illustrated as a channel member having a base 328 and upstanding side walls 330, the base having bores 332 providing clearance for the heads of the screws 192 which attach the form 188 to the cover. For applying downward pressure to the platen 198 a hydraulic cylinder 334 is pivotally mounted at 336 on the machine frame. A piston rod 338 projecting upwardly from the cylinder is connected by a link 340 to the free end of a lever 342 fulcrumed on a shaft 344 mounted in upstanding members 346 of the machine frame. The lever 342 as herein illustrated is an inverted channel structure comprising a generally horizontal base section 352 and downwardly inclined base section 354. As shown in FIG. 1, the base sections have side walls 356 extending downwardly therefrom. In order to obviate the occurrence of any horizontal movement of the pressure platen in the course of the operation of the lever 342 the platen is suspended from the lever on pins 348 (FIG. 1) fixed in the side walls of the lever and extending into longitudinal slots 350 (FIG. 4) formed in the side walls 330 of the platen. Pivotally mounted on studs 358 fixed in the side walls 356 are rolls 360, two at each side of the lever 342 arranged to bear against inclined surfaces 362 at opposite end portions of the side walls 330 of the pressure platen. The pressure applying movement of the lever 342 is imparted to the pressure platen by the rolls 360 which are free to move longitudinally of the pressure platen on the inclined surfaces 362 so that the slight increment of horizontal movement imparted to the rolls 360 in the course of the operation of the lever 342 is not transmitted to the pressure platen.

For charging the mold cavity the illustrated machine is provided with an injection mechanism of known construction which forces fluid plastic through the upstanding nozzle 140 illustrated in FIG. 7. To insure a firm and reliable engagement between the injection nipple 138 illustrated in FIG. 7 and the sprue member 122, the nipple is axially bored for sliding engagement with the reduced cylindrical upper end portion 364 of the nozzle structure and a spring 366 is interposed between the nozzle structure and the nipple, the lower end of the spring being seated on a shoulder 368 formed in the nozzle structure and the upper end being seated at the base of a circular groove 370 formed in the nipple. When the machine is at rest the spring holds the nipple in the position illustrated in FIG. 7 in which an outwardly projecting circular flange 372 formed in the nipple bears against a circular rabbet 374 formed in the bottom surface of the plate 144.

In the alternative construction illustrated in FIG. 8 a nipple 376 is formed with a stem 378 slidably mounted in an axial bore in a nozzle structure 380 and a spring 382 similar to the spring 366 is provided for maintaining upward pressure against the nipple. The structure illustrated in FIG. 8 differs from that illustrated in FIG. 7 primarily in that fluid is ejected from the nozzle through an axial bore 384 in the nipple whereas, in the structure illustrated in FIG. 7, fluid is ejected through an axial bore 386 formed in the reduced cylindrical upper end portion of the nozzle structure. The use of the nozzle structure illustrated in FIG. 8 would obviate the possible occurrence of a fin on the sprue which might interfere with the withdrawal of the sprue through the sprue member 122 in the unloading operation.

In the operation of the illustrated machine the cover of the mold package in the loading station is swung forwardly and downwardly into a horizontal position in which it is supported on the bracket 194 (FIG. 1), the latch 222 (FIGS. 12 and 13) having first been released by the movement of the latch release member 236 into its position illustrated in FIG. 12. The illustrated latch release member operates by thumb pressure against an inclined plate 388 at its upper extremity. This causes a pair of arms 390 at the lower extremity of the release member to press against the shaft 210 thereby to disengage the latch member from the shaft, thus permitting upward movement of the cover 98. In the course of the forward and downward movement of the cover to bring the shoe form into position for the unloading and reloading operations the latch members 242 (FIG. 10) are disengaged from the cross shaft 254 by the engagement of ears 392 formed in the latch members with the upstanding channel structure 102 formed in the base 96. The engagement of the ears 392 with the channel member arrests the swinging movement of the latch members and continued swinging movement of the cover 98 effects the disengagement of the cross shaft 254 from the latch members and permits the return of the cover to its normal position illustrated in FIG. 9 by the expansion of the springs 200. The completed shoe is now removed from the shoe form and a lasted shoe onto which an outsole is to be molded is mounted on the shoe form. The cover 98 is now swung upwardly and rearwardly into its intermediate position illustrated in FIG. 12 in which the cover is provisionally latched by the engagement of the shaft 210 in the V notches 208 formed in the channel member 206. Referring to FIG. 11, the operator now causes the cylinder 50 to be pressurized, thereby to swing the frame 38 in a clockwise direction in order to bring the carriage 22 and a mold package 20 thereon into position for the indexing operation. During the latter part of the clockwise movement of the frame member 38 the base of the notch 64 (FIG. 1) formed in the rail section 36 engages the right end portion of the rail section 40 in the mold charging station and swings said rail section upwardly into a horizontal position, thus providing a continuous track for the rolls 34 at the forward extremities of the mold carriages. The upward swinging movement of the rail section 40 also serves to swing the carriage 22 in the mold charging station upwardly from its position illustrated in FIG. 7 in which the carriage is supported upon the bed plate 146. Such upward movement of the carriage is sufficient to provide clearance between the carriage and the nipple 138, thus to permit indexing movement of the carriage from the mold charging station to the first idle station. The indexing movement advances the recently loaded package from the loading station to the mold charging station whereupon the cylinder 334 (FIG. 4) is pressurized to cause the pressure platen 198 to bear against the mold cover 98 and to force it downwardly into its mold closing position in which the shoe form 188 is firmly seated upon the beveled margins of the welt plates 154 to complete the closure of the mold cavity preparatory to the mold charging operation. The latch members 222 and 242 are now spring actuated as hereinbefore described to hold the cover in its mold closing position while the sole cures and sets on the shoe bottom. The operation of the lever 342 occurs after the carriage has swung downwardly into its position illustrated in FIG. 7 and is supported upon the bed plate 146 with the sprue member 122 in engagement with the nipple 138. The pressure of the lever 342 is maintained during the mold charging operation. Upon the completion of the mold charging operation the lower portion of the cylinder 334 is pressurized to elevate the lever 342 and the pressure platen 198 to provide clearance for the indexing movement of the ambulatory assembly from the mold charging station. In the next succeeding cycle of operations the carriage 22 in the mold charging station is elevated from its position illustrated in FIG. 7 as hereinbefore described preparatory to the indexing of the ambulatory assembly in the mold charging station to the first idle station of the machine.

For terminating the mold charging operation there is provided a pressure responsive mechanism similar to that disclosed in the Baker et al. application for United States Letters Patent hereinbefore referred to. Referring to FIG. 7, this mechanism comprises a stem 394 slidably mounted in the tube 124 and having at its upper end a head 396 slidably mounted in a suitable bore in the bottom mold member 120.

In the course of the mold charging operation the injection pressure exerted upon the charge in the mold cavity moves the head 396 downwardly and causes an adjustable head 398 at the lower end of the stem 394 to engage a horizontal plate 400 mounted on a parallel motion mechanism, moving said plate downwardly to cause the operation of a microswitch (not shown) which effects the termination of the mold charging operation. The illustrated parallel motion mechanism comprises a pair of upper arms 402 fulcrumed on a cross shaft 404 mounted in brackets 406 fixed to the bed plate 146, and a pair of lower arms 408 fulcrumed on a cross shaft 410 mounted in the brackets 406. At their free ends the arms 402 and 408 carry upstanding angle arms 412 which mount the plate 400. The plate 400 is normally held in its elevated position illustrated in FIG. 7 by a tension spring 414.

Having thus described our invention, what we claim as new and desire to secure by Letters Patent of the United States is:

1. In a plastic injection molding machine of the type in which a mold assembly is indexed from a loading station to a mold charging station, indexing means, a carriage for mounting any one of a plurality of mold assemblies, a fixed rail on which the carriage is conveyed from the mold charging station through a plurality of idle stations to the loading station, a swinging rail section in the mold charging station hinged adjacent to one end of the fixed rail for vertical movement from a horizontal position in alinement with the fixed rail downwardly thereby to transfer the carriage in the mold charging station between an indexing position and a mold charging position, a support for the carriage in the loading station, a third rail section fixed to said support and movable with the support to and from a position of horizontal alinement with the fixed rail, means operable only while the indexing means is at rest for effecting movement of the support to transfer said third rail section to and from its position of horizontal alinement with the fixed rail and thus to transfer the carriage between a loading position and an indexing position, and means whereby the movement of the third rail section to transfer the carriage in the loading station from its loading position to its indexing position swings said swinging rail section into horizontal alinement with the fixed rail thus to transfer the carriage in the mold charging station from its mold charging position to its indexing position.

2. In a plastic injection molding machine a mold charger including an injection nozzle, a pressure platen arranged in spaced relation to the nozzle, a carriage, a conveyor for transferring the carriage from a loading station into a charging station in which it is positioned between the nozzle and the platen, a package for mounting a shoe support and mold elements, means for removably securing the package to the carriage, said package comprising a base constructed to receive a plurality of mold elements, a cover for mounting a shoe form, means mounting the cover on the base for hinging movement relatively to the base and for a movement of translation relatively to the base, and a plurality of springs incorporated in the package and constructed and arranged to support the cover in an intermediate position in which the shoe form is spaced from the mold members and the cover is so positioned relatively to the base that it is brought into proximate relation to the platen by the transfer of the carriage from the load-station to the charging station, and a lever for actuating the platen to move the cover from its intermediate position into a mold closing position in which a shoe on the shoe form is arranged in contiguous relation to the mold elements, means for suspending the platen from the lever so as to permit relative horizontal movement of the platen and the lever, and means whereby the lever imparts to the platen the vertical component of its operating movement without imparting to the platen the horizontal component of its operating movement, said platen acting to hold the shoe form in its mold closing position during the mold charging operation.

3. In a plastic injection molding machine a mold charger including an injection nozzle, a pressure platen arranged in spaced relation to the nozzle, a carriage, a conveyor for transferring the carriage from a loading station into a charging station in which it is positioned between the nozzle and the platen, a package for mounting a shoe support and mold elements, fastening means for removably securing the package to the carriage, said package comprising a base constructed to receive a plurality of mold elements, a cover for mounting a shoe form, means mounting the cover on the base for hinging movement relatively to the base and for a movement of translation relatively to the base, and a plurality of springs incorporated in the package and constructed and arranged to support the cover in an intermediate position in which the shoe form is spaced from the mold members and the cover is so positioned relatively to the base that it is brought into proximate relation to the platen by the transfer of the carriage from the loading station to the charging station, a lever for actuating the platen to move the cover from its intermediate position into a mold closing position in which a shoe on the shoe form is arranged in contiguous relation to the mold elements and to hold the shoe form in said position during the mold charging operation, pin and slot connections whereby the platen is suspended from the lever so as to permit relative horizontal movement of the platen and the lever and pressure rolls carried by the lever and arranged to impart to the platen the vertical component of the operating movement of the lever without imparting to the platen the horizontal component of such operating movement, a first latch for yieldingly holding the cover in its intermediate position, and a second latch for positively holding the cover in its mold closing position.

References Cited in the file of this patent

UNITED STATES PATENTS

| | | |
|---|---|---|
| 1,343,425 | Whisler | June 15, 1920 |
| 1,890,968 | Carter | Dec. 13, 1932 |
| 2,103,860 | Mazzio | Dec. 28, 1937 |
| 2,235,222 | Lauterbach | Mar. 18, 1941 |
| 2,305,381 | Frauenheim | Dec. 15, 1942 |
| 2,701,389 | Capdevila | Feb. 8, 1955 |
| 2,732,584 | Bishop | Jan. 31, 1956 |
| 2,912,717 | Yarrison et al. | Nov. 17, 1959 |
| 2,937,405 | Berggren et al. | May 24, 1960 |
| 2,997,742 | Mieville | Aug. 29, 1961 |
| 3,006,032 | Baker et al. | Oct. 31, 1961 |

FOREIGN PATENTS

| | | |
|---|---|---|
| 1,050,332 | France | Sept. 2, 1953 |